Aug. 17, 1954 L. M. HARRIS, JR 2,686,830

FIELD RECOGNITION ARRANGEMENT

Filed Jan. 15, 1953

5 Sheets-Sheet 1

INVENTOR.
LESLIE M. HARRIS, JR.
BY
AGENT

INVENTOR.
LESLIE M. HARRIS, JR.
BY Philip S. Schmidt
AGENT

Aug. 17, 1954

L. M. HARRIS, JR 2,686,830

FIELD RECOGNITION ARRANGEMENT

Filed Jan. 15, 1953

5 Sheets-Sheet 3

INVENTOR.
LESLIE M. HARRIS, JR.
BY
AGENT

INVENTOR.
LESLIE M. HARRIS, JR.
BY Philip S. Schmidt
AGENT

Aug. 17, 1954 L. M. HARRIS, JR 2,686,830

FIELD RECOGNITION ARRANGEMENT

Filed Jan. 15, 1953 5 Sheets-Sheet 5

INVENTOR.
LESLIE M. HARRIS, JR.
BY
Philip S. Rhuidt
AGENT

Patented Aug. 17, 1954

2,686,830

UNITED STATES PATENT OFFICE 2,686,830

FIELD RECOGNITION ARRANGEMENT

Leslie M. Harris, Jr., Fairport, N. Y., assignor to Stromberg-Carlson Company, a corporation of New York Application January 15, 1953, Serial No. 331,446

16 Claims. (Cl. 178—5.2)

Figure 1:
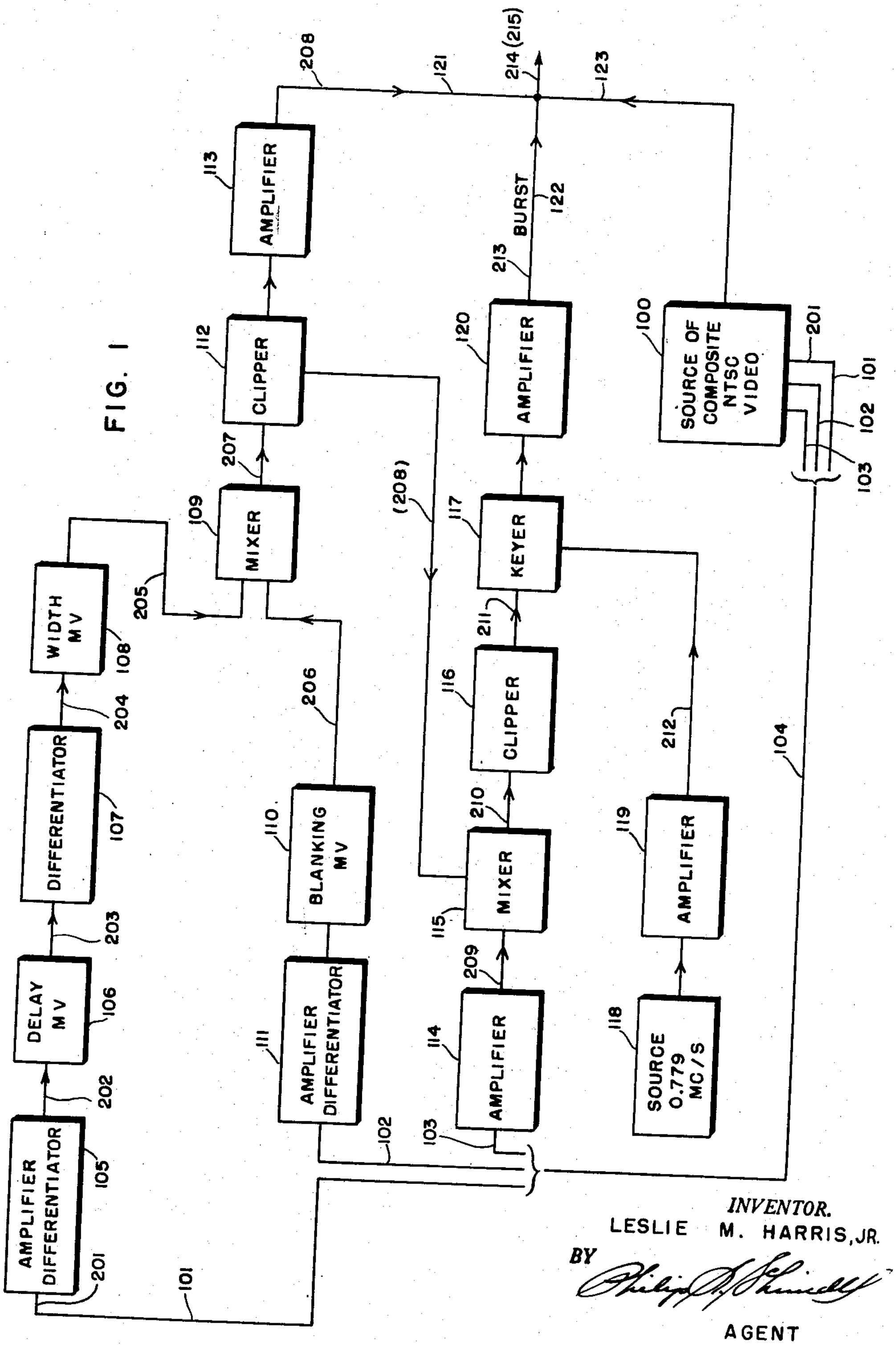

My invention relates to television systems, and more particularly to television systems employing band-shared simultaneous color signals.

One proposed band-shared simultaneous color television system is known as the NTSC (National Television System Committee) system. This system is discussed in B. D. Loughlin, "Recent Improvements in Band-Shared Simultaneous Color-Television Systems," Proceedings of the IRE, volume 39, October 19, 1951, at page 1264. My invention is readily applicable to the NTSC system.

Receivers for NTSC signals have a color reference generator which provides a color subcarrier signal for synchronous demodulation of the color information. See, for example, C. J. Hirsch, W. F. Bailey and B. D. Loughlin, "Principles of NTSC Compatible Color Television," Electronics, February 1952, p. 88 et seq. This color reference generator is stabilized and periodically synchronized with the color subcarrier at the transmitter by means of a "synchronizing burst" following each horizontal synchronizing pulse. As stated in the Hirsch et al. reference cited above and in R. B. Dome, "NTSC Color-TV Synchronizing Signal," Electronics, February 1952, p. 96 et seq. the proposed standard burst frequency is 3.898125 mc./s., to match the color subcarrier frequency.

It is desirable to employ color phase alternation in a band-shared simultaneous color television system. Color phase alternation means the reversal from one field to the next of the phase sequence, or timing order, of the color subcarrier information. This alternation occurs at the television transmitter. Phase errors at a receiver using color phase alternation produce opposite types of color errors on adjacent lines in the viewing screen. The human eye tends to average out these color errors.

Where color phase alternation is used, the color reference generator must supply two 3.898125 mc./s. voltages, one having a sin $\omega t$ phase and the other a $+\cos \omega t$ phase. The $\pm$ sign refers to the fact that the cos $\omega t$ voltage must lead the sin $\omega t$ voltage in one field and lag it in the next.

The change from $+\cos \omega t$ to $-\cos \omega t$ is readily initiated at the receiver by a vertical output pulse from the vertical deflection circuit. However, the change must be in the same sense as the corresponding phase change at the transmitter; that is, the color reference generator must supply $+\cos \omega t$ when the transmitter transmits the corresponding phase, and must supply $-\cos \omega t$ during the opposite phase. The receiver must therefore "recognize" whether the odd- or even-line field is being received, so that the color reference generator will know which phase of cos $\omega t$ voltage to supply. I term this requirement "field recognition."

It is an object of my invention to provide a new and useful arrangement for field recognition in a band-shared simultaneous color television system.

It is another object of my invention to provide, in a band-shared simultaneous color television system, a field recognition arrangement which has minimum susceptibility to interference and noise.

It is another object of my invention to provide a field recognition arrangement which requires a minimum of additional parts in each receiver, yet which is reliable in operation.

Further objects and advantages of my invention will become apparent as the following description proceeds and the features of novelty which characterize my invention will be pointed out with particularity in the claims annexed to and forming a part of this specification.

Figure 2:
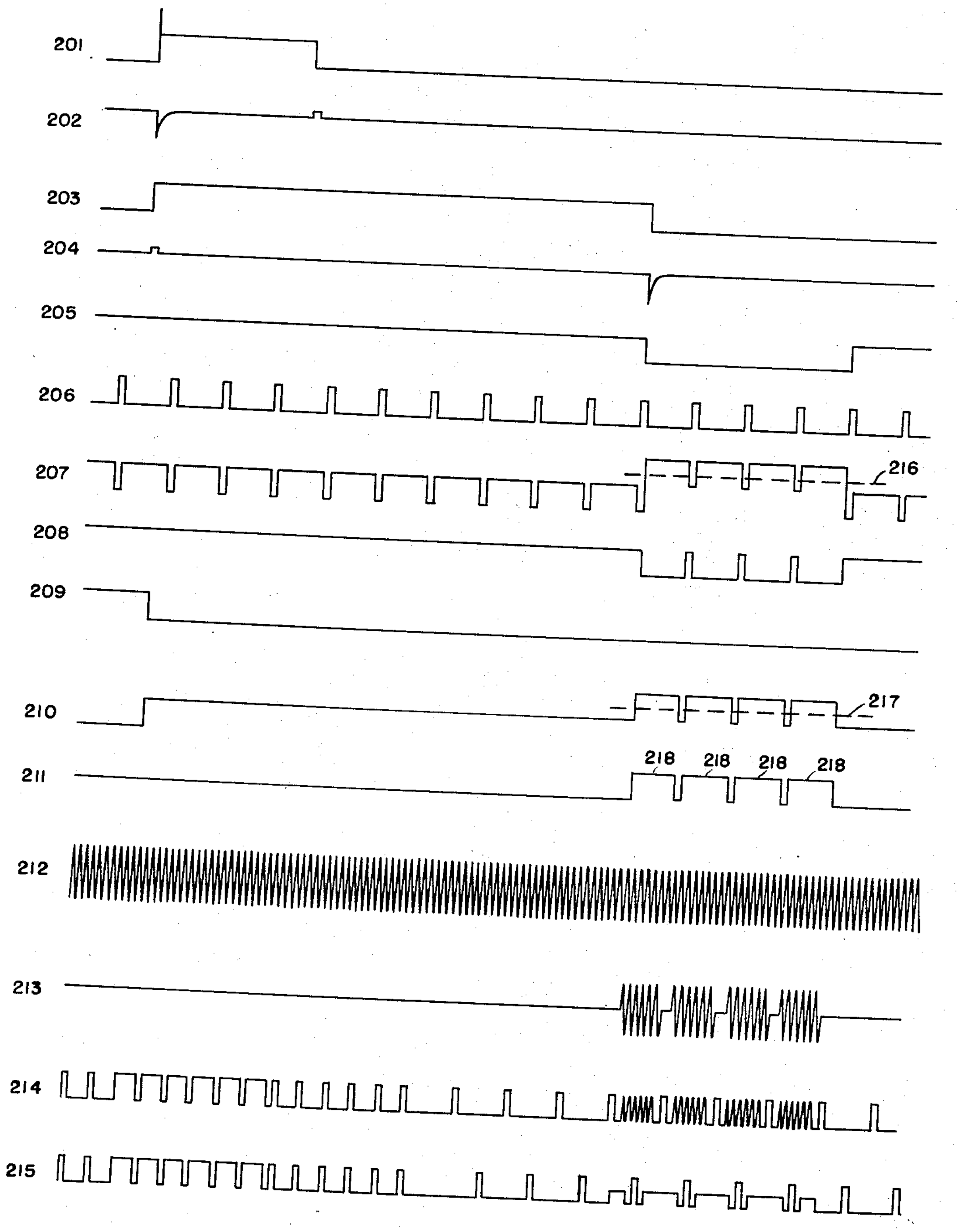
Figure 3:
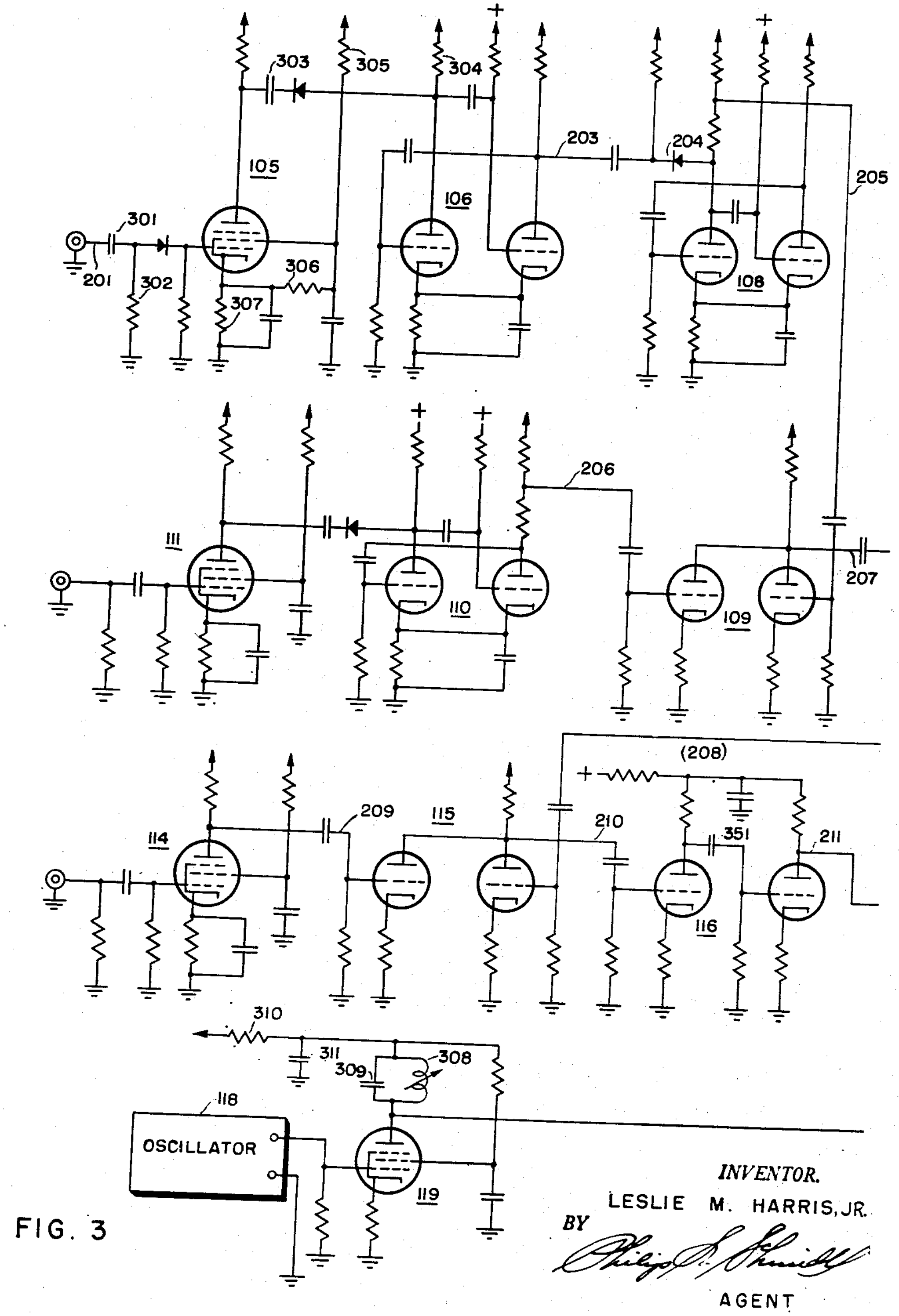
Figure 4:
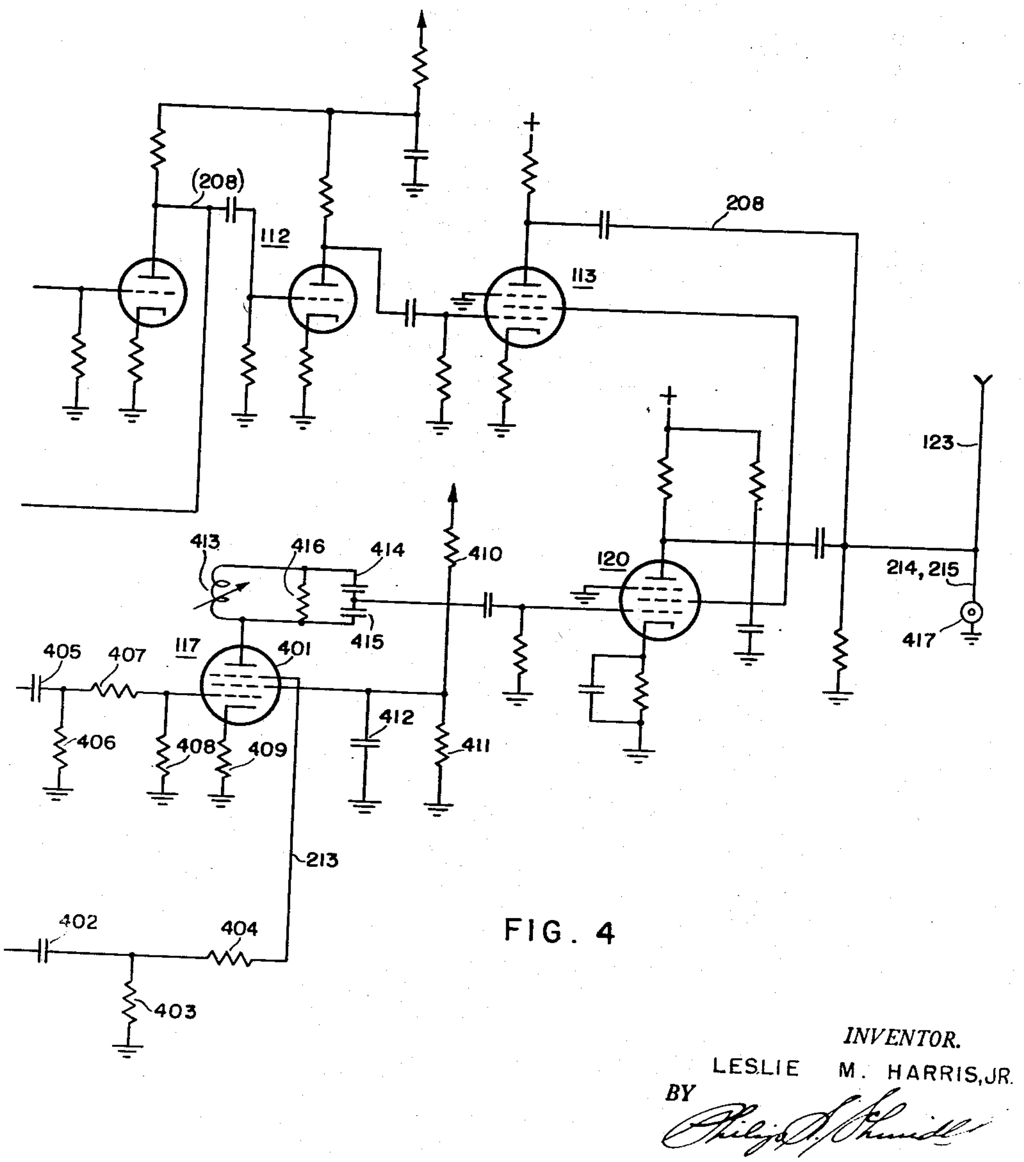
Figure 5:
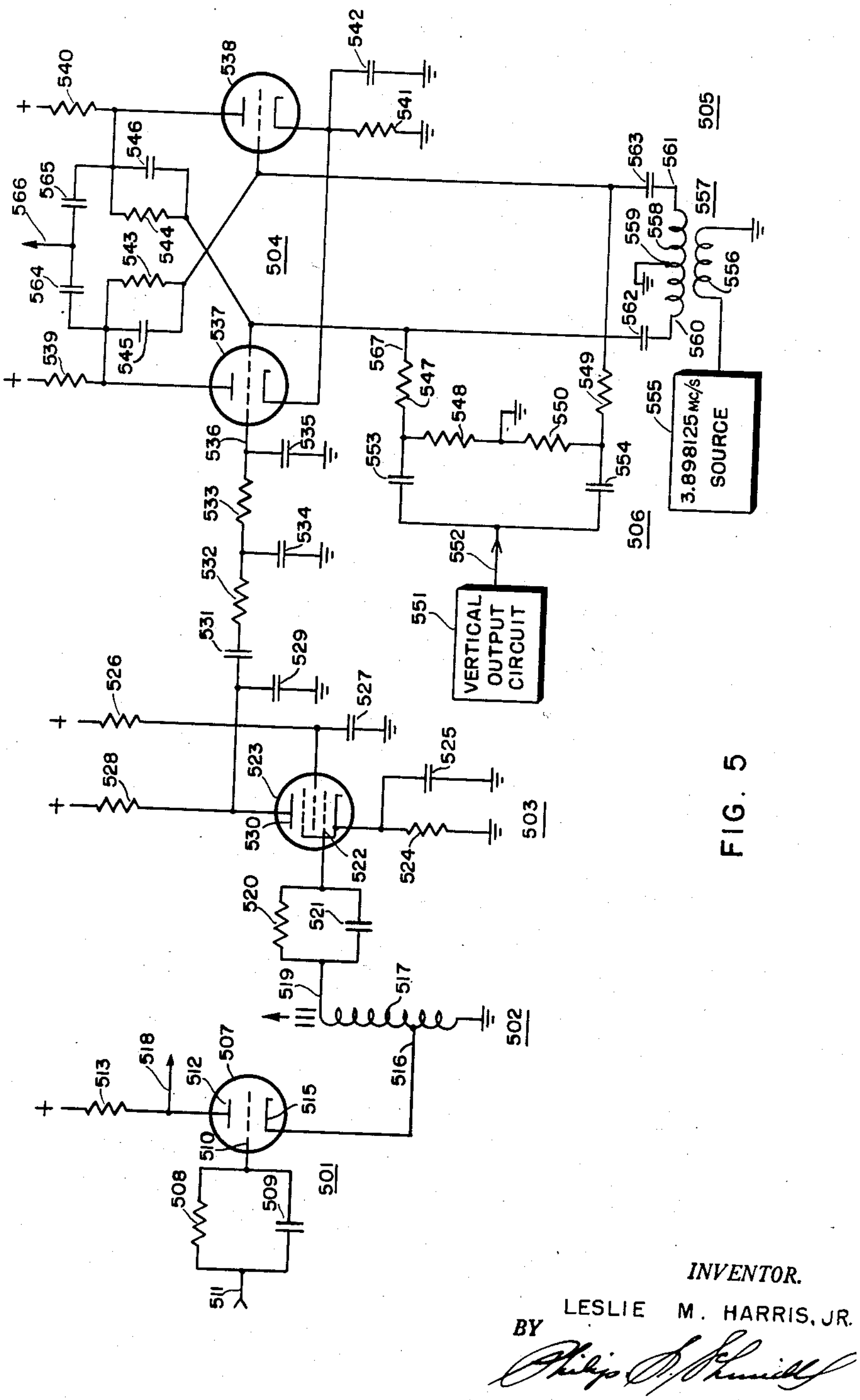

For a better understanding of my invention, reference may be had to the accompanying drawing in which Fig. 1 is a block diagram of one arrangement using my invention at a transmitter;

Fig. 2 shows waveforms encountered in the block diagram of Fig. 1;

Figs. 3 and 4, when the latter is placed to the right of the former with corresponding lines in alignment, show a suitable schematic diagram of the arrangement of Fig. 1; and Fig. 5 is a schematic diagram of one embodiment of my invention suitable for use in a television receiver.

In this discussion, blocks of 99 three-digit numbers have been reserved for each figure of the drawing. The first digit of each number corresponds to the figure number, thereby indicating to the reader the particular figure in which a given reference number first occurs. Thus, numbers 100–199 are in Fig. 1, etc.

In general, I accomplish the purposes of my invention by adding "bursts" of energy at predetermined times to the proposed standard NTSC video signal. Specifically, I prefer to provide bursts having a frequency of 0.779 mc./s. between the fourth and fifth, fifth and sixth, sixth and seventh, and seventh and eighth lines after the last equalizing pulse of odd line fields only. I term these bursts a field recognizer signal.

Each burst is preferably placed on a pedestal having substantially half the amplitude of the line and field synchronizing signals. The burst amplitude is preferably just sufficient to bring its peaks to the same amplitude as those synchronizing signals. To facilitate interlace, I prefer that an empty pedestal be added to the corresponding location in even line fields.

A suitable transmitting-station arrangement for adding the field recognizer signal to composite NTSC color television signals is indicated in Fig. 1. Block 100 indicates the source of NTSC signals. Since this source comprises equipment necessary for any broadcasting station using NTSC color-television standards, it has been felt unnecessary to indicate its detailed circuitry or characteristics. The synchronizing signal generator portion of this apparatus in every case furnishes horizontal and vertical drive pulses, and in many cases, a 30 c./s. square wave. This explanation is based on the type of sync signal generator which furnishes the latter waveform, since those skilled in the art can readily adapt other types to furnish a 30 c./s. square wave also. The horizontal and vertical drive pulses, as well as the 30 c./s. square wave, are employed in the arrangement of Fig. 1 to establish proper timing intervals. They arrive from block 100 over leads 101, 102 and 103, which are schematically indicated as combined in cable 104.

Vertical drive pulses arriving over lead 101 have waveform 201. (See Fig. 2.) They are amplified and differentiated in unit 105 to produce waveform 202. The latter waveform is used as a trigger for the delay multivibrator, unit 106, which furnishes waveform 203. Waveform 203 is differentiated in unit 107 to produce waveform 204. Waveform 204 provides the trigger for the width multivibrator, unit 108. The output of the latter is waveform 205 which is fed to one input of mixer 109.

The other input signal fed to mixer 109 is waveform 206. This waveform constitutes the output of the blanking multivibrator, unit 110. The trigger for the blanking multivibrator 110 is derived from horizontal drive pulses which are amplified and differentiated by unit 111. Horizontal drive pulses have not been illustrated on the waveform chart of Fig. 2 because they have the same general shape as the pulses of waveform 206. They are so slightly narrower than the waveform 206 pulses that the scale of the drawing would not permit showing the difference.

Mixer 109 inverts and adds waveforms 205 and 206 to produce waveform 207. The clipper circuit, unit 112, is adjusted to reject all variations in waveform 207 below level 216. After amplification in amplifier 113, the clipped version of waveform 207 results in waveform 208. Another waveform furnished by clipper 112 is essentially similar to 208, and hence is identified as (208).

The 30 c./s. square waves arrive from source 100 over lead 103 and are amplified in unit 114 to produce waveforms 209. The latter waveform constitutes one input of mixer unit 115, while the other input is waveform (208). The mixer unit inverts and adds waveforms (208) and 209 to form waveform 210. Waveform 210 is clipped to level 217 in clipper unit 116, thus furnishing waveform 211. (It may appear at first consideration that waveforms 211 and 208 are identical except for polarity. It will be recalled, however, that waveform 209 is a 30 c./s. square wave. Therefore waveform 211 contains pulses 218 only during every other field, depending upon whether waveform 209 is positive-going or negative-going during that field.)

Waveform 211 furnishes a gate, or keying, signal for keyer 117. The signal to be keyed in unit 117 is derived from any convenient source of sine waves having the desired frequency. In this case, the desired frequency is derived from unit 118, operating at 0.779 mc./s. The output of circuit 118 may be amplified in unit 119 to furnish waveform 212. The output of unit 117 is the keyed burst waveform, which may be amplified in unit 118 to form waveform 213.

From the foregoing description, it can be seen that waveform 213 comprises a burst signal occurring at the desired times relative to the composite NTSC signal, while waveform 208 comprises the pedestal upon which the burst is to be superimposed. Leads 121 and 122 carrying these waveforms are connected in multiple with lead 123 carrying composite NTSC video signal from block 100. The resulting waveform is shown at 214 for one field and at 215 for the other field. Only a portion of each complete field waveform is shown by 214, 215 in Fig. 2, since the unshown portions comprise the well-known NTSC composite waveform unmodified by my invention. Since the polarity of waveform 209 is fixed at the transmitter, and since one polarity is always associated with the odd-line field and the other with the even-line field, waveform 214, which contains the field recognizer signal, always occurs during an odd-line field, while waveform 215 occurs during an even-line field. Waveforms 214, 215 are used to modulate the transmitter of the broadcast station, and are thus radiated as R-F signals throughout the service area of the station.

Figs. 3 and 4, when the latter is placed to the right of the former with corresponding lines in alignment, show suitable detailed circuits for the arrangement of Fig. 1. In these cicuits, connection to a suitable source of positive potential is indicated generally by +. The negative terminal of this source, in accordance with convention, is understood to be connected to ground.

Examination of Figs. 3 and 4 reveals that only five basic circuits are involved. Thus the circuit used in each of blocks 105, 111, 113, 114, 119 and 120 comprises a conventional pentode amplifier having a grid coupling capacitor, grid return resistor, cathode resistor, screen dropping resistor, screen bypass capacitor and plate load resistor.

In the case of unit 205, there is added a diode rectifier in the grid input circuit and one in the plate output circuit. These diodes operate to clip unwanted pips from the differentiated vertical drive pulses which comprise waveform 201. Differentiation is accomplished by properly proportioning capacitor 301 and resistor 302, using principles well-known to those skilled in the art. Similarly, the output circuit of stage 105 has a differentiation circuit including capacitor 303 and resistor 304, thus providing additional differentiating action. The screen of unit 105 is fed from a voltage divider arrangement which includes screen dropping resistor 305, resistor 306, and cathode bias resistor 307.

Unit 119 also differs slightly from the other pentode amplifiers in that a tuned tank circuit including inductor 308 and capacitor 309 forms the plate load. This tank circuit is tuned to the frequency of oscillator 118 to increase amplification. The source of B+ is decoupled by resistor 310 and capacitor 311.

The third type of circuit, that of blocks 106, 108 and 110, is the multivibrator. The theory and operation of multivibrators of this type is given in F. E. Terman, "Radio Engineering," McGraw-Hill Book Co., Inc., New York, New York; 1947, p. 585, and an explanation here is consequently deemed superfluous.

The fourth type of circuit includes mixers 109 and 115, each of which comprises a pair of triodes having separate unbypassed cathode resistors and separate grid coupling capacitors and resistors, but having a common plate load. When separate signals are fed to the independent grids of these two triodes, their algebraic sum appears amplified and inverted across the common plate load resistor.

Clipper circuits 112 and 116 also comprise two triodes, these being connected in cascade. In this case, however, the plate voltage is reduced by a dropping resistor in series with the source of B+ to provide clipping or limiting action. This dropping resistor is decoupled by a bypass resistor, as is universal practice.

The fifth type of circuit employed in Figs. 4 and 5 is pentode keyer unit 117. In this case the voltage to be keyed, waveform 213, may be fed to the suppressor grid of tube 401 through a coupling network comprising capacitor 402 and resistors 403 and 404. The keying signal is waveform 211, and this may be coupled to the signal grid of tube 401 through a network comprising capacitor 405 and resistors 406, 407 and 408. The cathode bias resistor 409 of this tube is unbypassed to improve frequency response. The screen grid is fed from B+ by a voltage divider including resistors 410 and 411, the latter being bypassed by capacitor 412. The plate load of tube 401 is a resonant circuit comprising inductor 413 in parallel with a series combination of capacitors 414 and 415. The response of this circuit is broadened by means of parallel resistor 416 across the tuned circuit. The keyed output is taken from the junction of capacitors 414 and 415.

All of the foregoing circuits may have the values of their components chosen to produce substantially the waveforms shown in Fig. 2, using techniques well known to those skilled in the electronic art. The circuits of Figs. 3 and 4, as well as the arrangement of Fig. 1, are shown by way of example only, since other arrangements may readily be designed by those skilled in the art. For example, source 118 may operate on any desired frequency, although one on the order of 0.75 mc./s. is preferred. Too high a frequency cannot be adequately passed by the synchronizing signal separating circuits, while too low a frequency leads to difficulty in separating the field recognition signal bursts.

A four-line burst interval offers more reliable detection in the presence of noise than a shorter period. However, those skilled in the art can appreciate that shorter or longer intervals may be employed. Similarly, the pedestal is desirable to prevent extension into the white signal region. The blank pedestal in the even-line field assists in maintaining interlace. The field recognizer characteristics outlined are preferred because they do not interfere with the compatibility of the NTSC color television system with monochrome receivers.

Fig. 5 shows a schematic diagram of a preferred embodiment of my invention as applied to a NTSC color television receiver. This embodiment comprises a sync signal separator 501, a field recognizer signal separator 502, a governing signal generator 503, an electronic switch 504, a source 505 of two 3.898125 mc./s. voltages 180° out of phase with each other, and a source 506 of signals marking the end of each field.

Those skilled in the art are aware that television receivers universally have a sync signal separator, and that sync signal separator 501 may be the one already present in the receiver. Furthermore, those skilled in the art know that the type of NTSC color receiver shown in Fig. 7 of the Hirsch et al. reference cited above has a color reference generator which must have (1) a source of 3.898125 mc./s. energy, (2) means for deriving two 3.898125 mc./s. voltages 180° out of phase with each other, (3) a vertical deflection circuit arranged to furnish a pulse at the end of each field, and (4) means for switching from one of the derived 3.898125 mc./s. voltages to the other at the end of each odd-line field and back again at the end of each even-line field. Thus switch 504, source 505 and source 506 may be the corresponding items already present in the color reference generator.

My invention includes the addition of items 502 and 503 to cause items 504, 505 and 506 to furnish 3.898125 mc./s. voltage in the proper phase sense, that is, to cause the color reference generator to adopt the phase dictated by the received field recognizer signal.

The circuit of Fig. 5 is arranged to employ the specific waveforms 214 and 215 described in this specification, although those skilled in the art can appreciate after reading the explanation thereof that suitable modification might be made to accommodate other waveforms within the scope of my invention. In accordance with conventional practice, connection to a suitable source of positive potential is indicated by + in Fig. 5, with ground representing a plane of zero potential.

Proceeding now to a detailed consideration of the embodiment of Fig. 5, it is seen that sync separator 501 comprises tube 507, which is preferably a triode. A parallel resistor-capacitor combination 508—509 is placed between grid 510 of tube 507 and lead 511. Lead 511 is connected to any suitable point in the receiver carrying composite video and synchronizing signals. Plate 512 of tube 507 is provided with a plate load resistor 513. Cathode 515 of tube 507 is returned to ground via tap 516 of coil 517.

Coil 517 is tuned with its own and other stray capacitance to the frequency of the phase recognizer signal. Thus where a burst frequency of 0.779 mc./s. is used, coil 517 is resonated with stray capacitance to 0.779 mc./s.

As a result of the self-biasing action of resistor 508 and capacitor 509, the output of tube 507 appearing on lead 518 consists of synchronizing signals. The vertical and horizontal synchronizing pulses are used to synchronize the vertical and horizontal sweep circuits, while the 3.898125 mc./s. signals are used to synchronize the color reference generator. Field recognition signals are also present on lead 518, but those skilled in the art are aware that the circuits which follow cannot pass these signals, and hence remain undisturbed.

By resonating coil 517 with its own and other stray capacitance, its "Q" may be made sufficiently high to prevent the appearance of horizontal or vertical synchronizing pulses in its output. As a result, only the field recognition bursts appear between high potential output lead 519 and ground. These bursts are coupled via self-biasing resistor 520 and capacitor 521 to grid 522 of tube 523 in governing signal generator 503.

Tube 523 is preferably a pentode having cathode bias resistor 524 bypassed by capacitor 525, a screen dropping resistor 526 bypassed by capacitor 527, and plate load resistor 528. In addition, capacitor 529 is connected between plate 530 of tube 523 and ground. Tube 523 is biased near cut off in the absence of a grid signal, and capacitor 529 therefore charges virtually to the potential of the positive potential source through resistor 528. When a field recognition signal occurs, however, a voltage appears on lead 519 which is transferred to grid 522 of tube 523. Upon positive excursions of the burst oscillations on grid 522, tube 523 becomes conductive and consequently discharges capacitor 529 through its anode-cathode path and resistor 524 to ground. When the field recognition signal ceases, tube 523 is again cut off and capacitor 529 recharges virtually to the potential of the positive source. The resultant waveform is a pulse which is coupled via capacitor 531 to a two-stage differentiating network including resistors 532 and 533 and capacitors 534 and 535. The output of the differentiating network appearing on lead 536 is fed to one grid of electronic switch 504.

Electronic switch 504 preferably comprises the bi-stable type of circuit shown. This circuit is fully described in B. Chance (ed.) "Waveforms," MIT Radiation Lab. Series, McGraw-Hill Book Co., New York, New York, 1949; p. 164. This circuit comprises two triode tubes 537 and 538 having plate load resistors 539 and 540, respectively, and common cathode bias resistor 541 bypassed by capacitor 542. Plate to grid cross-coupling is provided by resistors 543 and 544 respectively bypassed by capacitors 545 and 546 to maintain high frequency response. Grid returns of tubes 537 and 538 are made through resistors 547, 548 and 549, 550, respectively.

As mentioned earlier, it is necessary that the switching means 504 change its conductivity status at the end of each field. A trigger suitable for initiating this switching action may be derived from the vertical output circuit 551 already present in the television receiver. Vertical output pulses appearing on lead 552 may be coupled through capacitor 553 to the junction of resistors 547 and 548, and also through capacitor 554 to the junction of resistors 549 and 550. Capacitor 553 has its value chosen relative to that of resistor 548 to provide differentiating action, and a similar proportioning is made relative to capacitor 554 and resistor 550. Thus a sharp pulse of proper polarity is delivered to the grid of a non-conducting tube in electronic switch 504 at the end of each field, regardless of which one of the tubes is conducting. In the absence of a governing signal on lead 506, switch 504 will change from conduction in one tube to the other at the end of each field.

Also applied to the grids of tubes 537 and 538 are two 3.898125 mc./s. signals substantially 180° out of phase. These signals originate in a source 555 of the color reference generator. Source 555 is coupled to primary 556 of transformer 557. The secondary 558 of this transformer has its center tap 559 grounded. The voltages appearing on leads 560 and 561 at the ends of its secondary winding are therefore 180° displaced from each other. These two signals are coupled via capacitors 562 and 563, respectively, to the grids of tubes 537 and 538.

Output coupling capacitors 564 and 565 are low in capacitance. The output of switch 504 appearing on lead 566 consequently comprises either one phase or the other of the 3.898125 mc./s. energy fed into the switch, depending upon whether tube 537 or 538 is conducting at the moment. Since conduction is switched from one tube to the other at the end of each field, the signal appearing on lead 566 is the $\pm \cos \omega t$ signal identified in Fig. 7 of the Hirsch et al. reference cited above.

Since portions 504, 505 and 506 operate whether a field recognition is present or not, there is a 50% chance that the phase of the signal on lead 566 is correct. It it is correct, no interference with their operation occurs. If it is not correct, the next field recognition signal received will cause governing signal generator 503 to place a governing signal on lead 536. Since lead 536 is connected to the grid of tube 537, and since this governing signal necessarily has a negative polarity, tube 537 is cut off.

The magnitudes of the signals on leads 536 and 567 are adjusted so that the signal on lead 536 is larger and later than that on lead 567, and consequently overrules the latter. The switching of conduction between tubes 537 and 538 is therefore prevented at the end of that particular frame, and no further transfer of conduction between tubes can occur until the next pulse is received over lead 552 at the end of the following field. The subsequent appearance of a governing signal on lead 536 will necessarily coincide with a pulse of the same polarity on tube 567, and operation of switch 504 continues as it would in the absence of the governing signal. Thus my invention affords means for field recognition which is operative within one frame to resynchronize color phase alternation at the receiver with that at the transmitter. This short correcting time is desirable when the receiver is first turned on. Noise may subsequently mask the phase recognizer signal, but switch 504 will continue to operate properly as long as vertical synchronization is maintained. This is an important advantage of my invention.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a television system, the combination of a transmitter operating to radiate band-shared simultaneous color television signals employing color phase alternation on a field-to-field basis, said transmitter having means for adding a field recognition signal to said transmitted signals indicative of the sense of said color phase alternation, a receiver operating to accept said signals and convert them into a color television image, said receiver having means for separating said field recognition signal from said transmitted signal, a color reference generator including a source of signals synchronous with the color subcarrier frequency, means for deriving from said signals synchronous with the color subcarrier frequency two signals substantially 180° displaced from each other, means for switching from one of said derived signals to the other at the end of each field, and means for causing said switching means to furnish the particular one of said derived signals corresponding to the sense indicated by said separated field recognition signal.

2. The combination of claim 1 in which said field recognition signal comprises bursts of energy occurring at a predetermined time after the last equalizer pulse in alternate fields only.

3. The combination of claim 1 in which said field recognition signal comprises bursts of energy having a frequency on the order of 0.75 mc./s.

4. The combination of claim 1 in which said field recognition signal comprises bursts of energy having a frequency of substantially 0.779 mc./s.

5. The combination of claim 2 in which said brusts occur between a plurality of the lines following the last equalizing pulse in alternate fields only.

6. The combination of claim 2 in which said bursts occur between the fourth and fifth, fifth and sixth, sixth and seventh, and seventh and eighth lines after the last equalizing pulse in alternate fields only.

7. The combination of claim 2 in which said bursts are placed on a pedestal having substantially half the amplitude of the synchronizing signals, said bursts having an amplitude sufficient to bring their peaks to the same amplitude as said synchronizing signals.

8. The combination of claim 7 in which the remaining fields have a pedestal substantially identical to that in said alternate fields, and occurring at substantially the same time following the last equalizer pulse thereof.

9. The combination of claim 1 in which said field recognition signal comprises bursts of energy having a frequency on the order of 0.75 mc./s. and occurring at a predetermined time after the last equalizing pulse of alternate fields only, said bursts being placed on a pedestal having substantially half the amplitude of the synchronizing signals, said bursts having an amplitude sufficient to bring their peaks to the same amplitude as said synchronizing signals; and in which the remaining fields have substantially identical pedestals without bursts occurring in the same relative location following the last equalizer pulse as do said pedestals of said bursts in said alternate fields.

10. The combination of claim 1 in which said field recognition signal comprises bursts of energy having a frequency on the order of 0.75 mc./s which occur between the fourth and fifth, fifth and sixth, sixth and seventh, seventh and eighth lines after the last equalizing pulse of alternate fields only, each said burst being placed on a pedestal having substantially half the amplitude of the synchronizing signals, said bursts having an amplitude sufficient to bring its peaks to the same amplitude as said synchronizing signals; and in which substantially identical pedestals without bursts occur in the remaining fields in the same relative location following the last equalizer pulse.

11. In a television receiver operating to convert band-shared simultaneous color television signals with color phase alternation into a color television image, said signals including a field recognition signal indicative of the sense of the phase of said color phase alternation being received, the combination of a color reference generator including a source of signals synchronous with the color subcarrier frequency; means for deriving from said signals synchronous with the color subcarrier frequency two signals substantially 180° displaced from each other; means for switching from one of said derived signals to the other at the end of each field; means for separating said field recognition signal from said received color television signals; means for generating a governing signal at a predetermined time relative to the occurrence of said field recognition signal such that said governing signal carries information regarding the sense of said color phase alternation; and means for causing said switching means to furnish the particular one of said derived color subcarrier signals having the sense corresponding to said governing signal.

12. The combination of claim 10 in which said field recognition signal comprises bursts of energy occurring at a predetermined time after the last equalizer pulse in alternate fields only.

13. The combination of claim 12 in which the switching means comprises a bi-stable multivibrator circuit having input grids and output plates, and said multivibrator is changed from one stable state to the other by field pulses from the vertical output circuit of said receiver, said field pulses being applied to said grids in parallel and said derived signals being applied to said input grids in push-pull; and in which said output plates are connected in parallel, from a signal standpoint, to furnish a color subcarrier signal having alternating color phase.

14. The combination of claim 12 in which said signal deriving means comprises a transformer having a primary fed from said source of said synchronous signals and a center-tapped secondary having an electrically neutral center tap, said two derived voltages appearing between the ends of said secondary winding and said center tap.

15. The combination of claim 12 in which said receiver has a synchronizing signal separator and said field recognition signal separating means comprises a resonant circuit tuned to the frequency of said field recognition signal, said resonant circuit being fed with synchronizing signals, including said recognizer signal, from said synchronizing signal separator.

16. The combination of claim 12 in which said receiver has a synchronizing signal separator and said field recognition signal separating means comprises a resonant circuit tuned to the frequency of said field recognition signal, said resonant circuit being fed from said synchronizing signal separator, and in which said means for generating said governing signal comprises an electron discharge tube having at least an anode, cathode and control electrode, said control electrode being fed from said resonant circuit; a source of potential; electrical storage means; said anode and cathode being connected in series with said source of potential and being shunted by said electrical storage means, whereby there appears across said electrical storage means a voltage whose waveform depends upon the conductive condition of said electron discharge device, which in turn is dictated by the voltage appearing on its said grid from said resonant circuit.

References Cited in the file of this patent

UNITED STATES PATENTS

| Number | Name | Date |
|---|---|---|
| 2,378,746 | Beers | June 19, 1945 |